Dec. 30, 1958
L. F. CIESIELSKI ET AL
2,866,739
RECOVERY OF BETA-SITOSTEROL FROM TALL OIL
PITCH BY STEAM DISTILLATION
Filed May 18, 1955
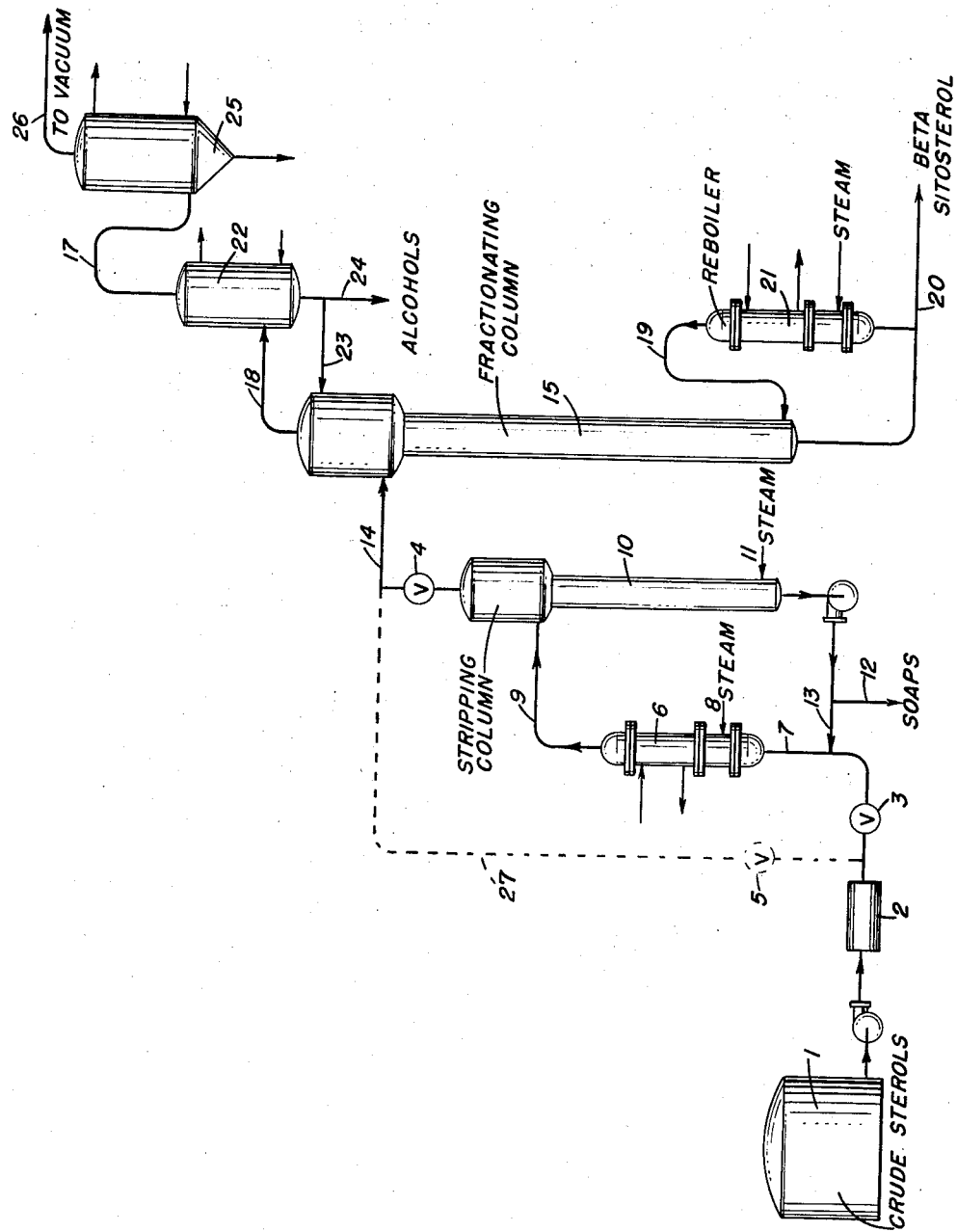
INVENTOR.
LEO F. CIESIELSKI,
HANS ALBRECHT,
BY
*Harold Shain*
AGENT.

2,866,739

RECOVERY OF BETA-SITOSTEROL FROM TALL OIL PITCH BY STEAM DISTILLATION

Leo F. Ciesielski, Norwalk, and Hans Albrecht, Stamford, Conn., assignors to American Cyanamid Company, New York, N. Y., a corporation of Maine Application May 18, 1955, Serial No. 509,352

9 Claims. (Cl. 202—46)

This invention relates to a novel method for the separation of beta-sitosterol from higher aliphatic alcohols. More particularly, it relates to the separation and recovery of beta-sitosterol and higher aliphatic alcohols, derived from tall oil pitch, by fractional distillation.

It is well known that tall oil pitch is an abundant source of beta-sitosterol, and methods have previously been suggested to isolate this therapeutically valuable substance. These methods, however, have not been entirely satisfactory because several process steps have heretofore been required to produce a product of acceptable purity.

In order to separate beta-sitosterol and higher aliphatic alcohols from tall oil pitch they must first be liberated from combination with the fatty acids and rosin acids contained therein. This is accomplished by saponifying the tall oil pitch with a suitable alkali such as alcoholic potassium hydroxide. The resulting soaps are then treated to isolate the sterols, higher alcohols and other unsaponifiables, and this may be done by crystallization from aqueous solutions of the soaps, by solvent extraction or by other suitable procedures. In all cases, however, the unsaponifiables are obtained as a mixture containing beta-sitosterol, higher aliphatic alcohols such as lignoceryl alcohol, coloring matter and small amounts of higher fatty acid and rosin acid soaps. This mixture is known as crude sterols.

The separation of beta-sitosterol from crude sterols has been attempted by solvent extraction methods using selective solvents such as petroleum naphtha, lower aliphatic alcohols, benzene, ether and the like, but complete purification is difficult to accomplish by these methods and recovery of the solvent is costly. More effective separations have been accomplished by first converting the sterol into derivatives such as the benzoate prior to recrystallization, but this procedure is also expensive. It is a principal object of the present invention to provide more efficient separation methods based on steam fractionation or rectification which are better suited for large scale commercial operations.

It is still another object of this invention to recover beta-sitosterol from tall oil by steam stripping saponified tall oil pitch and thereafter separating beta-sitosterol from higher aliphatic alcohols by rectification of the resulting vapors with steam under reduced pressures and at elevated temperatures. A related object is the recovery of the same products by stripping black liquor soap with steam under conditions, such as reduced pressures of 40–100 mm. of mercury, which result in the volatilization of sterols such as beta-sitosterol and higher aliphatic alcohols followed by separating these materials from each other by the fractionation process of the invention, with or without a preliminary condensation.

Another object of this invention is to provide a method for the separation of beta-sitosterol from a mixture of beta-sitosterol and higher aliphatic alcohols using easily available fractionating equipment.

Other objects will appear as the description of the invention proceeds.

These and other objects of this invention are accomplished by vacuum rectification of a mixture of beta-sitosterol and higher aliphatic alcohols at temperatures below 300° C. and in the presence of steam. A particular embodiment of the invention comprises the separation of beta-sitosterol from saponified tall oil pitch by vaporizing, in the presence of steam, the crude sterols away from the soaps and coloring matter, separating the beta-sitosterol from the higher aliphatic alcohols by steam fractionation under reduced pressure at temperatures below 300° C. and recovering the beta-sitosterol and higher aliphatic alcohols, each in relatively pure form.

Tall oil pitch is the residue which remains after stripping the major portion of fatty acids and rosin acids from crude tall oil by distillation. It contains approximately 15–20% sterols as fatty acid esters, about 30% free and esterified rosin acids, about 15–20% unsaponifiable matter other than sterols, about 30% free and esterified fatty acids and about 5% material of a ligneous nature. Tall oil pitch may be saponified using any of the conventional methods. One method is to react 100 parts by weight of tall oil pitch with 30 parts by weight of potassium hydroxide (85%) in ethanol. This liberates the sterols and higher alcohols from their esters and forms soaps of all the rosin and fatty acids present. Saponification is preferably carried out at reflux (about 80° C.) for about 2 hours. The resulting soap mixture is then preferably diluted with hot water, cooled slowly to about 20–24° C. and allowed to stand at this temperature for about 24 to 36 hours. This results in crystallization of a sterol-higher aliphatic alcohol mixture which is filtered off, washed with cold ethanol and dried. The resulting crude sterols typically contain about 70–85% of beta-sitosterol, about 20% of higher aliphatic alcohols of about 20–26 carbon atoms, about 0.5–5% of soaps of higher fatty acids and rosin acids and minor quantities of coloring matter.

Crude sterols which may also be used as a starting material may be derived from other sources. Thus, for example, black liquor soap may be extracted with a mixture of ethanol and naphtha or with furfural, benzene, lower aliphatic alcohols, and the like. The residue remaining after the removal of the solvent is the crude sterol which may also be a starting material for the separation of the sterol from the higher aliphatic alcohols of this invention.

The present invention is based on the discovery that the beta-sitosterol and higher aliphatic alcohols of about 22–26 carbon atoms can be separated from the crude sterols containing them by vaporization with steam at temperatures of about 250°–275° C. and reduced pressures of about 40–70 millimeters of mercury absolute and that the resulting organic vapors can be separated into their components by vacuum rectification in the presence of steam when temperatures of about 190° to 280° C. are maintained in the fractionating column. Under these conditions the beta-sitosterol and higher alcohols are recovered from the crude sterols and are separated from each other with little or no thermal decomposition.

The drawing is a schematic diagram showing the apparatus for separating and recovering beta-sitosterol using the mixture of higher aliphatic alcohols and beta-sitosterol previously described as the starting material. By controlling the flow of materials, as hereinafter described, the system may be adapted for the separation and recovery of beta-sitosterol using any similar crude sterol as the starting material.

Referring to the drawing the mixture of beta-sitosterol and higher aliphatic alcohols containing minor amounts of soaps and coloring matter is stored in a heated storage vessel 1. The mixture is held at a temperature sufficiently high to maintain the beta-sitosterol and higher alcohols in a liquid state. Ordinarily a temperature of about 135° C. is adequate; however it may be necessary to go as high as 140° C. to 145° C. It is preferred that the contents of the vessel be maintained in an atmosphere of an inert gas such as nitrogen in order to prevent the formation of peroxides which ultimately cause reduced yields due to decomposition of the sterol.

With the valves 3 and 4 being in the "open" position and valve 5 in the "closed" position, the mixture is pumped through a pre-heater 2 to raise its temperature so that it enters a vaporizer 6 through line 7 at a temperature of about 255° C. The preheater 2 is not essential but its use reduces the quantity of sensible heat that has to be supplied to the vaporizer 6.

Superheated steam, at a rate of about 15 mols to 1 mol of feed by volume, or less than 1:1 by weight, is fed into the mixture entering the vaporizer 6 at a temperature of about 260° C. to 275° C. through line 8. The soaps and the coloring matter, having vapor pressures much lower than the vapor pressures of the beta-sitosterol and higher aliphatic alcohols, remain in the liquid state while the beta-sistosterol and higher aliphatic alcohols are vaporized. The vaporizer 6 is preferably a tubular heater containing vertical tubes surrounded by a heating jacket supplied with condensing vapors such as high pressure steam or a mixture of diphenyl and diphenyl oxide as indicated by the arrows. Vaporization is carried out at reduced pressures on the order of 40 to 70 millimeters of mercury absolute and at temperatures which may vary from about 250° C. to 275° C. or higher but which are always well below 300° C.

The soaps and coloring matter overflow, along with the vaporized beta-sitosterol and higher aliphatic alcohols, through line 9 into a stripping column 10, minor amounts of the soaps and coloring matter being carried by the steam in the form of droplets. The stripping column 10 may be of any conventional type such as a plate and bubble cap, packed column, strip or screen plate or the like. In this stripping column the beta-sitosterol and higher aliphatic alcohols are maintained in a vapor phase. Steam enters the stripping column through line 11 and serves as a stripping medium and further reduces the pressure of the vapors of beta-sitosterol and higher aliphatic alcohols. The quantity of superheated steam entering the stripping column 10 may be about 3 mols per mol of the vaporized crude sterol. The soaps and coloring matter are drawn off at 12 but an optional recirculation line 13 may be provided to return a portion of the soaps and coloring matter to the vaporizer 6. A return ratio of about 5:1 by weight at this point is found to be satisfactory. The vaporized beta-sitosterol and higher aliphatic alcohols are drawn from the stripping column 10 into a fractionation column 15, through line 14. The pressure at the top of the stripping column is about 30 to 50 mm. Hg (abs.).

The distillation column 15 may be of any suitable design and construction such as a bubble plate tower provided with a vapor condenser system 22 and a tubular reboiler 21 which is similar in construction to the vaporizer 6 and heated with condensing vapors of steam or of a diphenyl-diphenyl oxide mixture. The beta-sitosterol and higher aliphatic alcohols, still in the vapor phase, enter the fractionating column 15 at about its midpoint. In this way, the composition of the entering vapors will most nearly approximate the composition on the plate adjacent to the inlet, thus resulting in more efficient fractionation. The temperature of the crude sterol vapors on entering the distillation column 15 are on the order of 240° C. to 265° C. with 255° C. being preferred. Superheated steam enters the lower part of the fractionation column 15, preferably through the reboiler 21 and line 19 at a temperature of about 260° C. to 280° C. The steam reduces the partial pressure of the beta-sitosterol and higher alcohols thus permitting operations at correspondingly lower temperatures. The ratio of additional steam to crude sterol entering the fractionating column may be widely varied from about 5:1 to about 20:1 on a molar basis.

The temperatures inside the fraction column may also vary from about 190° to 200° C. at the top of the column, and from about 260° C. to 280° C. at the bottom. It has been found that a temperature of about 300° C. in the distillation column 15 causes slight degradation of the beta-sitosterol and at higher temperatures considerable quantities of decomposition products are formed. Therefore, the temperatures in the distillation column in excess of 300° C. should be scrupulously avoided.

Part of the beta-sitosterol recovered from the base of the fractionation column 15 is preferably recirculated through the reboiler 21 to provide additional heat for the lower plates of the column and to assist in stripping the volatiles from the liquid; however, careful control of the temperatures in the reboiler 21 is required to prevent degradation of the beta-sitosterol. Efficient separation of the beta-sitosteral and higher aliphatic alcohols in the distillation column may be accomplished when about 10 mols of steam is provided for each mol of crude sterol entering the distillation column 15. The beta-sitosterol, free of higher aliphatic alcohols, may be withdrawn from the bottom of the fractionating column through line 20 while the vaporized higher alcohols and water vapor are drawn into condensing apparatus through line 18.

The condensing apparatus may be of conventional design and construction. The condenser 22 for the higher alcohols is provided with a reflux line 23 to return a portion of the higher alcohols to the fractionation column. The reflux ratio may be varied over a rather wide range from 2:1 to about 14:1 by weight. The higher alcohols are drawn off through line 24. It may be desirable, however, to additionally provide a steam condenser 25 having the feed line 17 whereby the water vapors and residual alcohol vapors not previously condensed may be recovered.

The line 26 at the top of the steam condenser 25 leads to a vacuum jet (not shown) which may be a conventional two or three stage type. An initial pressure of about 20 to 60 mm. Hg (abs.) is usually required in order to provide an adequate low pressure in the various pieces of apparatus in the system. It is preferred however that the vacuum jet operate at about 20 to 30 mm. Hg (abs.). Analysis of the recovered aliphatic alcohols by Digitonin Precipitation and the Lieberman-Burchard Test indicates that no beta-sitosterol is present. Likewise analysis of the recovered beta-sitosterol shows it to be free of higher aliphatic alcohols.

Another embodiment of this invention is the separation of beta-sitosterol and higher aliphatic alcohols using mixtures that are substantially free from soaps as the starting material. Referring again to the drawing, a mixture of beta-sitosterol and higher aliphatic alcohols is stored in a heated storage vessel 1. The temperature in the storage vessel 1 is sufficiently high to maintain the starting material in a fluid condition; a temperature of about 135° C. to 140° C. is usually required for this purpose. An inert gas, such as nitrogen, is introduced into the vessel 1 to prevent the formation of peroxides. The valves 3 and 4 are now in the "closed" position while valve 5 is "open." The liquid mixture is pumped through a preheater 2 to raise its temperature so that it enters the fractionating column 15, through lines 27 and 14, at about 255° C. to 275° C. with 260° C. being preferred. The fractionating column 15 may be of the type previously described and may be operated under the same conditions although the feed in this case is a liquid. The mixture of beta-sitosterol and higher aliphatic alcohols enters the distillation column 15 at a plate containing a composition approximating, as nearly as possible, the composition of the lower portion of the feed. The steam entering from the line 19 reduces the partial pressure in the column permitting the beta-sitosterol to remain as a liquid while the higher aliphatic alcohols are eventually vaporized and drawn out at the top of the distillation column 15 through line 18 and condensed.

The operating conditions are further illustrated by the following table. It should be understood, however, that the specified conditions are given for purposes of illustration and the invention in its broader aspects is not limited thereto.

TABLE A

*Vaporizer*

Temperature of feed_____ 255° C.
Steam temperature_____ 260–275° C.
Steam: feed ratio (mols)_____ 15:1.
Pressure, top_____ 40–45 mm. Hg. (abs.).

*Preheater*

Temperature of feed_____ 140° C.

*Stripping column*

Steam: feed ratio (mols)_____ 3:1.
Temperature of feed_____ 250–260° C.
Steam temperature_____ 260–275 C.
Pressure, top_____ 30–35 mm. Hg. (abs.).

*Fractionating column*

Total pressure, top of column____ 20 mm. Hg. (abs.).
Total pressure, bottom of column__ 60 mm. Hg. (abs.).
Temperature, top of column_____ 190–202° C.
Temperature, bottom of column___ 260–280° C.
Temperature of feed_____ 255° C.
Temperature of steam_____ 260–275° C.
Steam: alcohol-sterol ratio (mols)__ 9:1 to 16:1.

It will be obvious that some departures may be made in the apparatus and processes herein shown and described without departing from the spirit of the invention as the specific nature of the raw material and its components vary. This is within the knowledge of the man skilled in the art.

What we claim is:

1. A method for the separation and recovery of beta-sitosterol and higher alcohols of about 22 to 26 carbon atoms from mixtures thereof which comprises subjecting mixed vapors of said beta-sitosterol and said alcohols to vacuum rectification in the presence of steam at temperatures of about 190°–280° C. and recovering said higher alcohols as an overhead condensate and said beta-sitosterol as a heavy bottom condensate.

2. A method according to claim 1 wherein the ratio of steam to organic vapors is from about 0.5:1 to 3:1 by weight.

3. A method according to claim 1 wherein the reflux ratio is from 2:1 to about 14:1 by weight.

4. A method according to claim 1 wherein the rectification is carried out at pressures within the range of about 20–60 millimeters of mercury absolute.

5. A method for the recovery and separation of beta-sitosterol and higher alcohols of about 22 to 26 carbon atoms from crude sterols which comprises heating a mixture of crude sterols and steam at temperatures of about 250° to 275° C. and pressures of about 40–70 millimeters of mercury absolute and thereby vaporizing said beta-sitosterol and said alcohols therefrom, rectifying the resulting vapor mixture at temperatures of about 190°–280° C. and recovering said higher alcohols as a light overhead condensate and said beta-sitosterol as a heavier condensate.

6. A method of treating tall oil pitch for the recovery of beta-sitosterol and higher aliphatic alcohols of about 22 to 26 carbon atoms therefrom which comprises liberating beta-sitosterol and said higher aliphatic alcohols from tall oil pitch by saponification, crystallizing crude sterols from the resulting soap mixture, heating said crude sterols in admixture with steam at temperatures of about 250° to 275° C. and pressures of about 40–70 millimeters of mercury absolute and thereby vaporizing beta-sitosterol and higher aliphatic alcohols of about 22 to 26 carbon atoms therefrom, rectifying the resulting vapor mixture by steam fractionation at temperatures of about 190°–280°C. and recovering said higher alcohols as a light overhead condensate and said beta-sitosterol as a heavier bottom condensate.

7. A method according to claim 6 wherein the ratio of steam to organic vapors is from about 0:5 to 3:1 by weight.

8. A method according to claim 6 wherein the reflux ratio is from 2:1 to about 14:1 by weight.

9. A method according to claim 6 wherein the rectification is carried out at pressures within the range of about 20–60 millimeters of mercury absolute.

References Cited in the file of this patent

UNITED STATES PATENTS

| | | |
|---|---|---|
| 2,240,365 | Dreger | Apr. 29, 1941 |
| 2,530,810 | Christenson et al. | Nov. 21, 1950 |
| 2,573,727 | Potts | Nov. 6, 1951 |
| 2,598,269 | Kirschenbauer | May 27, 1952 |
| 2,704,764 | Mattikow et al. | Mar. 22, 1955 |
| 2,715,639 | Albrecht et al. | Aug. 16, 1955 |

OTHER REFERENCES

"Information on High Vacuum Distillation" (April 1947), available at Distillation Products, Inc., Rochester, N. Y.; page 4.

Morton-Laboratory Technique in Organic Chem. (McGraw-Hill, 1938), pp. 124 and 142.